(12) United States Patent
Karabey et al.

(10) Patent No.: US 12,363,163 B2
(45) Date of Patent: Jul. 15, 2025

(54) NLP BASED IDENTIFICATION OF CYBERATTACK CLASSIFICATIONS

(71) Applicant: Microsoft Technology Licensing, LLC, Redmond, WA (US)

(72) Inventors: Bugra Karabey, Redmond, WA (US); Tvisha Gangwani, Seattle, WA (US); Houtan Faridi, Redmond, WA (US); Priyatham Allala, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 283 days.

(21) Appl. No.: 17/575,360

(22) Filed: Jan. 13, 2022

(65) Prior Publication Data

US 2023/0224324 A1 Jul. 13, 2023

(51) Int. Cl.
*H04L 9/40* (2022.01)

(52) U.S. Cl.
CPC ...... *H04L 63/1466* (2013.01); *H04L 63/1416* (2013.01)

(58) Field of Classification Search
CPC .................. H04L 63/1416; H04L 63/1466
USPC ........................................................ 726/23
See application file for complete search history.

(56) References Cited

U.S. PATENT DOCUMENTS

| | | | |
|---|---|---|---|
| 10,956,477 B1 * | 3/2021 | Fang | G06F 40/30 |
| 11,265,339 B1 * | 3/2022 | Mistry | H04L 63/1408 |
| 11,736,527 B1 * | 8/2023 | Joseph Durairaj | H04L 63/1433 726/1 |
| 11,991,193 B2 * | 5/2024 | Sherwood | H04L 63/1416 |
| 2018/0131716 A1 | 5/2018 | Chantz et al. | |
| 2018/0160309 A1 * | 6/2018 | Turgeman | G06F 3/041 |
| 2020/0053120 A1 * | 2/2020 | Wilcox | G06F 40/205 |
| 2020/0092319 A1 | 3/2020 | Spisak et al. | |
| 2020/0137103 A1 | 4/2020 | Ngo et al. | |
| 2020/0177636 A1 * | 6/2020 | Linn | G06F 16/951 |
| 2021/0126938 A1 * | 4/2021 | Trost | G06F 21/552 |
| 2021/0248240 A1 * | 8/2021 | Comish | G06F 21/577 |
| 2021/0258791 A1 * | 8/2021 | Jochem | H04W 12/66 |
| 2021/0390562 A1 * | 12/2021 | Reznic | G06Q 40/03 |
| 2022/0130274 A1 * | 4/2022 | Krishna Raju | H04L 63/1433 |
| 2022/0191250 A1 * | 6/2022 | Laliberte | H04L 63/1466 |

(Continued)

OTHER PUBLICATIONS

Ayoade et al., "Automated Threat Report Classification over Multi-Source Data", Conference: 4th IEEE International Conference on Collaboration and Internet Computing (CIC), Oct. 18, 2018, 236-245 pages.

(Continued)

*Primary Examiner* — David P Zarka
(74) *Attorney, Agent, or Firm* — Schwegman Lundberg & Woessner, P.A.

(57) ABSTRACT

Generally discussed herein are devices, systems, and methods for cyber attack response. A method can include receiving, at a compute device, a natural language description of activity on a computer network, executing, based on the natural language description, a natural language processing (NLP) model to provide a tactic and technique of a cyber attack associated with the natural language description, determining, based on the provided tactic and technique, a response to mitigate the cyber attack, and implementing the determined response on the computer network.

9 Claims, 5 Drawing Sheets

(56) References Cited

U.S. PATENT DOCUMENTS

2024/0114042 A1\* 4/2024 Frey .................... H04L 63/1433
2024/0143751 A1\* 5/2024 Soliman ............. H04L 63/1425

OTHER PUBLICATIONS

International Search Report and Written Opinion received for PCT Application No. PCT/US2022/052912 mailed on Jan. 3, 2024, 13 pages.

\* cited by examiner

NLP BASED IDENTIFICATION OF CYBERATTACK CLASSIFICATIONS

BACKGROUND

Attacks against the critical infrastructure sectors such as healthcare, transport, and water are rising. Such attacks have cyber physical impacts that could lead to severe injuries and even loss of life. Currently, the identification and mapping of cyber incident findings against the cyberattack stages, tactics, and techniques are implemented manually by human analysts/experts. This manual mapping is time-consuming, inconsistent, and error prone.

Currently, cyber attack incident responders manually convert an incident description into tactics, techniques, and procedures (TTP) of the adversary. Each incident description and corresponding TTP becomes an entry in a database. The database provides a mapping that can be traversed to understand what the adversary is trying to attain using a common taxonomy, common notion of attack stacks, and so on. So this is commonplace for threat hunters, threat intelligence analysts, and cyber incident responders and currently is currently done manually.

SUMMARY

A device, system, method, and computer-readable medium configured for improved cyber attack response are provided. Many cyber attack response frameworks operate based on mapping computer network activity to one or more corresponding cyber attack tactics and techniques. An NLP model can be trained identify the tactics and techniques based on a description of the cyber attack, a natural language description of the cyber attack provided by a cyber incident responder, or a combination thereof. The NLP model can help reduce an amount of time it takes to respond to the cyber attack, thus reducing the damage caused by the cyber attack.

A method can include receiving, at a compute device, a natural language description of activity on a computer network. The method can include executing, based on the natural language description, a natural language processing (NLP) model to provide a tactic and technique of a cyber attack associated with the natural language description. The method can further include determining, based on the provided tactic and technique, a response to mitigate the cyber attack and implementing the determined response on the computer network.

The method can further include training the NIP model based on input, output examples that include natural language descriptions of cyber attacks as input and tactics and techniques as output. The tactic can be a high-level description of a behavior that one attempting to carry out a cyber attack is trying to accomplish. The technique can be a detailed description that indicates how a threat actor is trying to accomplish the tactic.

The natural language description can be received through an input software control of a user interface and the tactic and technique are provided on an output software control of the user interface. The determined response can be determined by a response framework coupled to receive traffic activity on the computer network. The NLP model can further provide data indicating a threat actor associated with the tactic and technique.

DETAILED DESCRIPTION

Embodiments provide support for cyberattack incident responders and complement the threat hunt. Embodiments can complement a response framework, such as security information and event management (SIEM), security orchestration, automation and response (SOAR) processes, extended detection and response (XDR), endpoint detection and response (EDR), or a combination thereof, via automatic (without human interference after deployment) identification of cyberattack tactics, and techniques. There are various frameworks and taxonomies in the industry, outlining these tactics, and techniques. The notion of a "tactic" and "technique" is a pervasive theme across the response frameworks in use in the industry. Embodiments identify and map to the tactic and technique in a response framework-agnostic manner making embodiments compatible with any cyber attack response framework. Embodiments identify the respective tactic and technique based on a natural language "incident description". Embodiments can use an artificial intelligence (AI) and natural language processing (NLP) driven approach to identify the tactic and technique based on the incident description.

Automating the mapping in an AI/NLP driven manner reduces human effort, time to identification of the tactic and technique, and also reduces opportunity for human error. Mapping to tactic and technique in an automated manner also improves post-compromise detection of adversaries by highlighting the steps an attacker may have taken or could take next in a timely fashion. These automated, timely, and accurate mappings of incident description to tactic and technique will also help reduce enterprise risk by helping identify how an attacker got in and how are they laterally traversing the network. The automated mappings will also provide a common ground for sharing timely and accurate threat intel across organizations and reducing time to react to a cyber attack event. The reduced time to react to a cyber attack event increases the chances that the cyber attack will be mitigated and reduces the amount of damage done to a network for a given attack.

Many companies currently has a fa stack of security solutions, spanning endpoint security, posture management, security information and event management, and threat detection/response. Nearly all of these solutions refer to attack stages in the terminology of tactics and techniques in their usage scenarios. These solutions also provide features for the users to define and refer to these tactics and techniques. Thus, an NLP/AI driven approach in auto-mapping incident descriptions to the specific tactics and techniques complements and augments these offerings, and improves upon these security offerings.

Mapping threat actor actions to one or more tactics and techniques is an initial step in preventing and mitigating an attack by the threat actor. The tactics and techniques can be mapped to detections and alerts. There are several benefits to mapping incident descriptions to tactics and technique. These benefits include improved post compromised detection of adversaries. Once the mapping to the tactic and technique is completed, it is easier to figure out where, in the network, an adversary has access. Next steps of the adversary (sometimes called "threat actor") can be determined making it easier to remediate and reduce the extent of the attack. The mapping to tactics and techniques also provides a common ground for sharing threat intelligence across organizations. Automating the process of mapping incident description to tactic and technique leads to reduced human effort, time, and likelihood of error.

Example portions of natural language descriptions include "multiple failed logons", "Bitcoin demanded", "multiple DNS queries executed to communicate with servers", and "injection of shell code into explorer.exe". These descriptions can accurately be mapped to, in the context of MITRE ATTACK tactic and technique descriptions, using a trained NLP model the following (tactic, technique) pairs: (credential access, brute force), (impact, data encryption), (command and control, dynamic resolution), and (privilege escalation, process injection).

Figure 1:
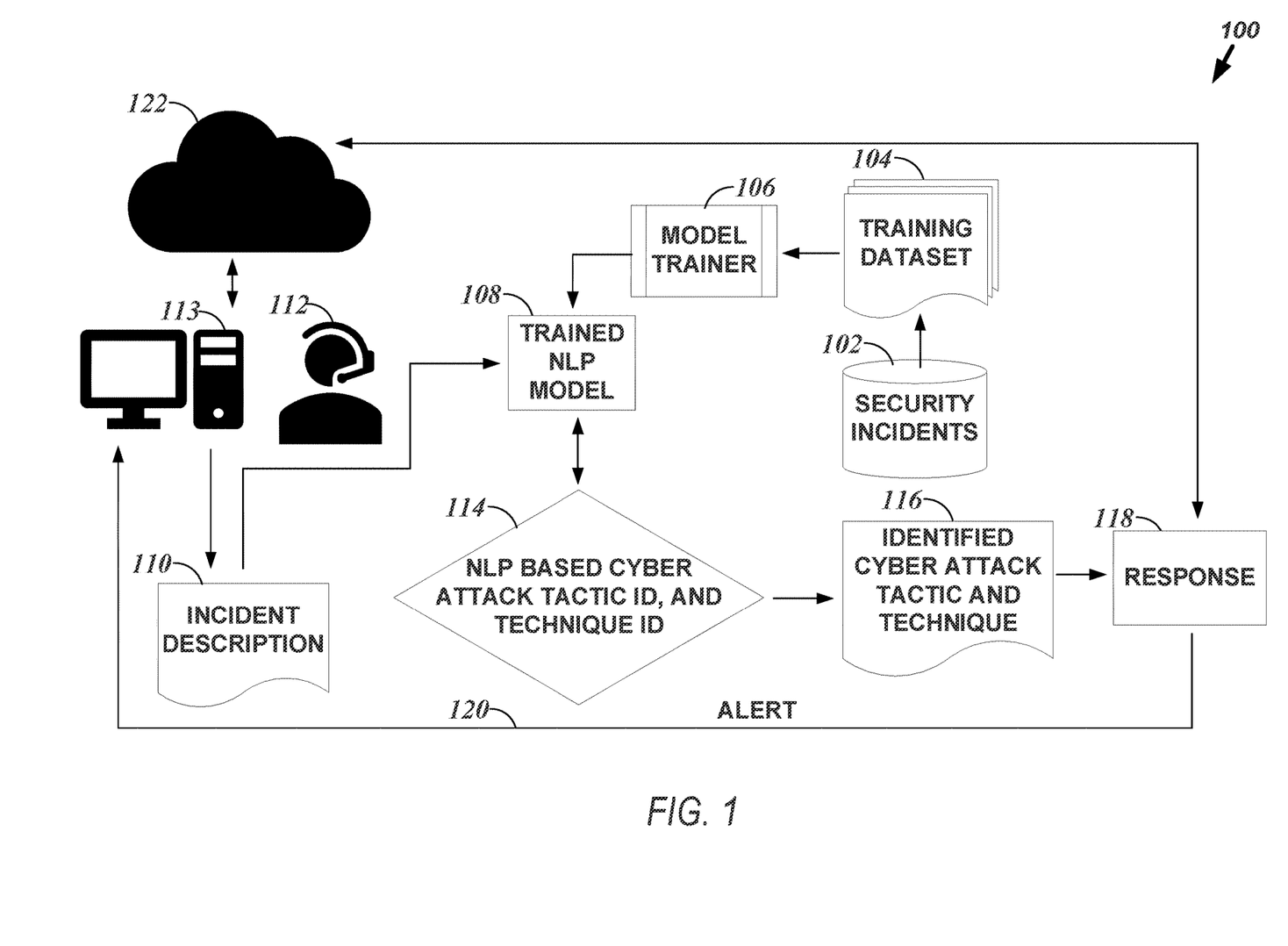
FIG. 1 illustrates, by way of example, a block flow diagram of an embodiment of a system for attack tactic and technique identification.

FIG. 1 illustrates, by way of example, a block flow diagram of an embodiment of a system 100 for attack tactic and technique identification. The system 100 as illustrated includes a security incidents database 102 that is a source of a training dataset 104 for training a model, using a model trainer 106. The model trainer 106 produces a trained natural language processing (NLP) model 108 that is used to quickly and accurately identify a cyberattack tactic and technique. A cyberattack responder 112 monitors (via compute device 113) a computer network 122 for anomalous activity and implements cyber response techniques to handle the anomalous activity in the computer network 122. The cyber attack responder 112 can record the anomalous activity using a compute device 113. The record of the anomalous activity, in the embodiment of FIG. 1, is an incident description 110. The incident description 110 can be provided to the trained NLP model 108. The trained NLP model 108 can provide output 114 that identifies a tactic and technique based on the incident description 110. An identified cyber attack tactic and technique 116 can be provided to a response framework 118. The response framework 118 can generate an alert 120 that is provided to the cyber attack responder 112, via the compute device 113.

The records in the security incidents database 102 map a prior incident description to tactics and techniques associated with the prior incident description. "Prior" means before deployment of the trained NLP model 108.

Figure 2:
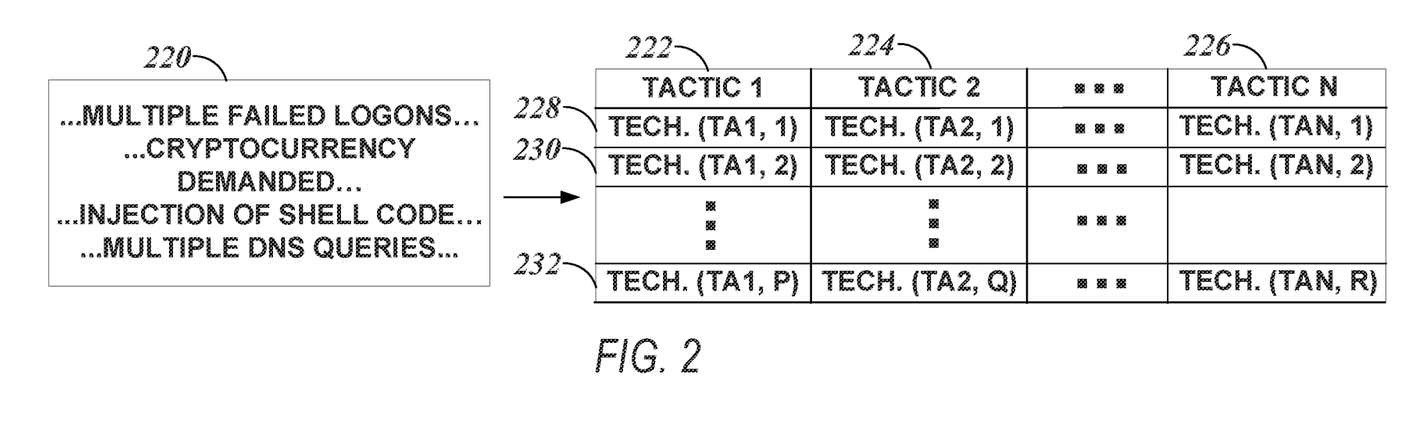
FIG. 2 illustrates, by way of example, a diagram of an example of a prior incident description mapping to one or more tactics and techniques.

FIG. 2 illustrates, by way of example, a diagram of an example of a prior incident description 220 mapping to one or more tactics 222, 224, 226 and techniques 228, 230, 232. The prior incident description 220 is a natural language description of activity on the network 122 (or another computer network) that is related to a cyber attack event. The prior incident description 220 provides details regarding actions relevant to the cyber attack event. Some example actions are provided but are not limiting. There are many cyber attacks and corresponding actions that are performed in carrying out the cyber attacks. The cyber attacks are also evolving, such that new cyber attacks are being realized. Embodiments are not limited to cyber attacks that currently exist and are applicable to identifying and responding to future cyber attacks that can be described using natural language description.

Breaking down cyber attacks into tactics 222, 224, 226 and techniques 228, 230, 232 is one common way of categorizing cyber attacks. MITRE Corporation of McLean, Virginia, maintains a list of cyber attack techniques and tactics. This list of attack techniques and tactics can be accessed at https://attack.mitre.org/matrices/enterprise/ (last accessed Jan. 4, 2022). This is just one example of a mapping of cyber attacks to tactics and techniques.

The tactic 222, 224, 226 are high-level descriptions of behaviors that a threat actor (one attempting to carry out a cyber attack) is trying to accomplish. The tactic 222, 224, 226 represents the "why" of a technique 228, 230, 232 in a same column as the tactic 222, 224, 226. For example, initial access is a tactic a threat actor will try to perform to gain access to the network 122.

Techniques 228, 230, 232 are detailed descriptions that represent how the threat actor achieves the tactic 222, 224, 226. Drive-by compromise, exploit public-facing application, external remote services, hardware additions, phishing, replication through removable media, supply chain compromise, trusted relationship, and valid accounts are all techniques 228, 230, 232 for the tactic of initial access.

There can be multiple techniques 228, 230, 232 for each tactic 222. The notation of FIG. 2 abbreviates tactic 1 as "TA1", tactic 2 as "TA2" and so on. "TECH. (TA1, 1)" means a first technique to achieve tactic 1, "TECH. (TAN, R) means an $R^{th}$ technique to achieve tactic N, and so on. Each of the tactics 222, 224, 226 can have a same or different number of techniques 228, 230, 232 used to achieve the tactic 222, 224, 226. Some tactics 222, 224, 226 have a different number of known techniques used to achieve the tactics and some tactics 222, 224, 226 have a different number of known techniques used to achieve the tactics. The number of tactics 222, 224, 226 and known techniques 228, 230, 232 used to achieve the tactic 222, 224, 226 is growing as cyber attacks evolve and new cyber attacks are realized.

Referring to both FIGS. 1 and 2, the security incidents database 102 includes information mapping prior incident descriptions 220 to corresponding tactics 222, 224, 226 and techniques 228, 230, 232. The information from the security incidents database 102 provides at least a portion of the training dataset 104. The training dataset 104 is a supervised training dataset of input, output examples. The input of an input, output example is a prior incident description 220. The output of the input, output example is the corresponding tactics and techniques. The training dataset 104 is historically generated manually, with the incident responder 112, or a different subject matter expert (SME), mapping the prior incident description 220 to one or more 222, 224, 226 or techniques 228, 230, 232.

The model trainer 106 generates the trained NLP model 108. The model trainer 106 is a compute device that adjusts weights of an NLP model in an attempt increase an accuracy of the NLP model. More details regarding the training of the NIT model 108 are presented regarding FIG. 5.

The trained model 108 operates on an incident description 110 generated by the incident responder 112 (via the compute device 113). The incident responder 112 can monitor activity on the network 122. The incident responder 112 can provide a natural language description of the network activity into a user interface 332 (see FIG. 3) of the compute device 113.

The trained model 108, in the form of a neural network (NN), can include one or more encoding or embedding layers, one or more decoding layers, an activation layer, or a combination thereof. One or more of the NN layers can include recurrent NN (RNN) layers, attention, feed forward network (FFN) layers, or the like.

NLP models have a wide variety of applications. NLP models herein are trained to understand an intent of a user. The possible intents are a corpus of tactics and techniques. During training the tactic and technique are determined, by the NLP model, in a supervised manner, based on the training dataset 104. After deployment, the tactic and technique are determined based on the incident description 110. An output 114 of the trained model 108 is data indicating a tactic and technique. The output of the trained model 108 may not be a natural language description of the tactic and technique that is readily understandable by a human. The output 114 can be converted to a human-readable form, a form compatible with a response framework 118, or the like. The identified cyber attack tactic and technique 116 represents the output 114 converted to a human-readable form or a form compatible with the response framework 118. The identified cyber attack tactic and technique 116 can be provided for display on the output software control 336 (see FIG. 3). LUIS, from Microsoft Corporation, of Redmond, Wash., is an example of an NLP model that is can be used in embodiments. Other similar models exist or can be generated to operate to identify tactics and techniques (and entities) based on the incident description 110.

In some embodiments, the trained NLP model 108 can be trained, by the model trainer 106, to associate a series of tactics and techniques with an entity. Consider a kill chain with multiple tactics and techniques and defense evasion strategies. Also consider that a given entity can be prone to use the same tactics and techniques in performing a cyber attack. The defense evasion strategies, tactics and techniques, or a combination thereof can be used by a given actor multiple times in carrying out different cyber attacks. Thus, the NLP model 108 can be trained based on input, output examples that include the natural language description of a cyber attack as input and the tactics and techniques as well as one or more entities that are likely associated with the description as output.

The response framework 118 can analyze data from an application, security device, host system, other device, or a combination thereof of the network 122, the trained NLP model 108, or a combination thereof. The response framework 118 can provide an alert 120 to the compute device 113 or other device of the incident responder 112. The response framework 118 can receive log data from the network 122. The log data can detail traffic on the network 122. The traffic can include logon attempts, tasks executed, files opened, files stored, files or communications sent, data or operation requests sent, responses to data or operation requests, a combination thereof, or the like.

Example response frameworks 118 include security information and event management (STEM), security orchestration, automation, response (SOAR), extended detection and response (XDR), endpoint detection and response (EDR), a combination thereof, or the like. Example SIEM and SOAR products from Microsoft Corporation of Redmond, Wash. are Azure Sentinel (a SIEM product), and M365 Defender (a. SOAR product). Other companies, such as IBM, Securonix, Splunk, Rapie, LogRhythm, FireEye, Fortinet, ServiceNow, CrowdStrike, AlienVault, McAfee, and Anomali, among others, provide other STEM and SOAR products. These products (organized into frameworks) exist and can provide improved responses based on output of the trained NLP model 108. The trained NLP model 108 can quickly identify the tactic and technique of actions performed in the network 122 so that the response framework 118 can operate based on the identified tactic and technique.

Figure 3:
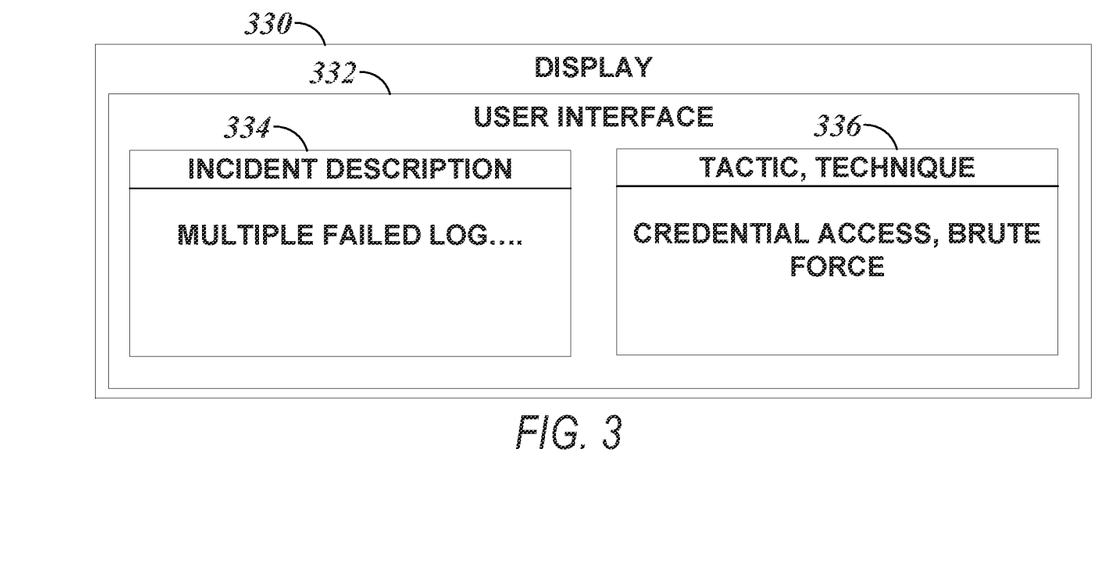
FIG. 3 illustrates, by way of example, a diagram of an embodiment of a display device that presents the user interface to the incident responder.

FIG. 3 illustrates, by way of example, a diagram of an embodiment of a display device 330 that presents the user interface 332 to the incident responder 112. The display device 330 can be a part of the compute device 113. The user interface 332 can include a text input software control 334 that receives textual input from the incident responder 112 through an input device (e.g., a keyboard, a microphone, a touchscreen, or the like). The textual input to the text input software control 334 can be provided manually by the incident responder 112 (via an input device), automatically through an activity log provided by a device of the network 122, or a combination thereof. The user interface 332 can include an output software control 336 that provides the one or more tactics, techniques related to the text provided in the text input software control 334. The output software control 336 can provide the output of the trained NLP model 108, output of the response framework 118, or a combination thereof.

Figure 4:
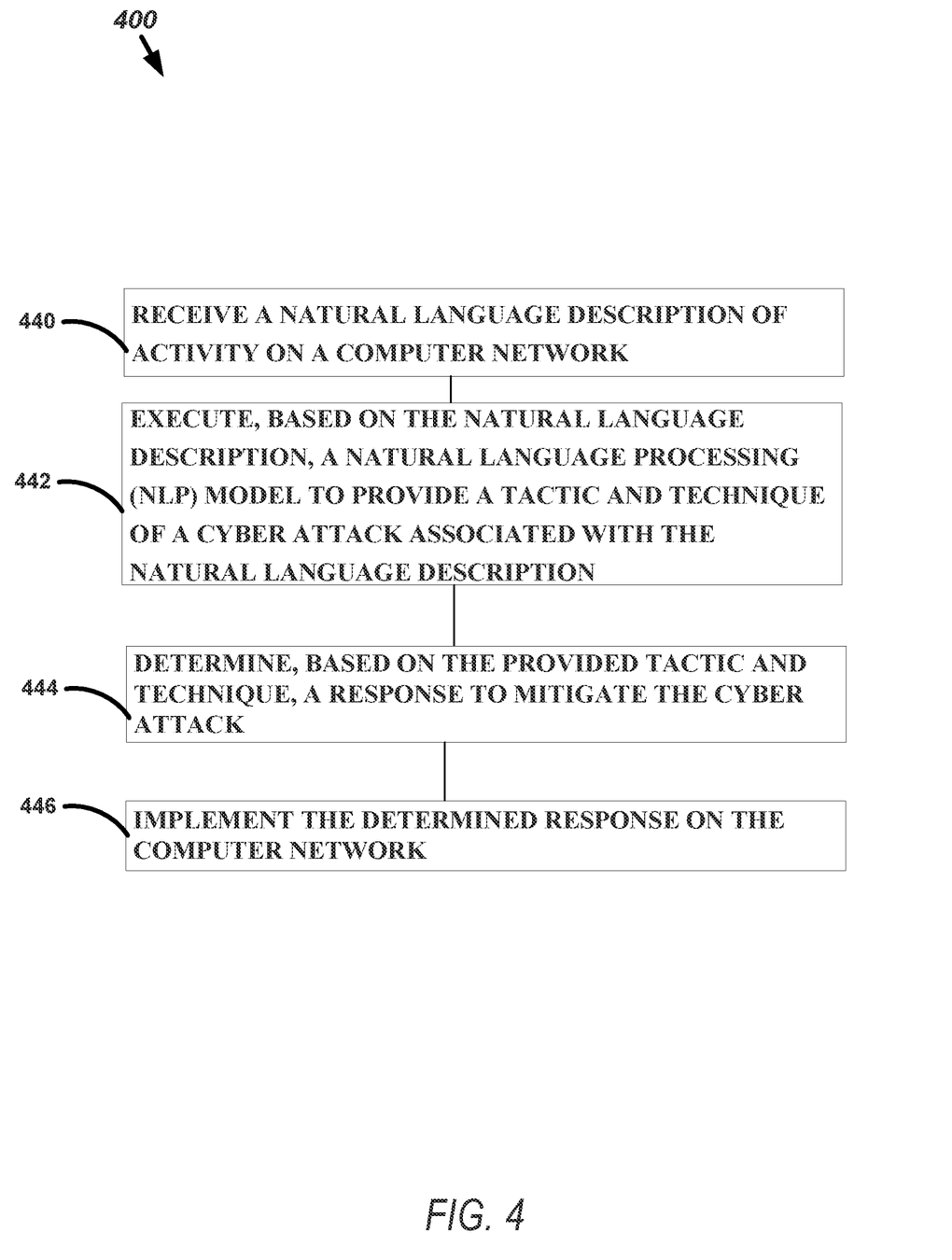
FIG. 4 illustrates, by way of example, a diagram of an embodiment of a method for cyber attack response.

FIG. 4 illustrates, by way of example, a diagram of an embodiment of a method 400 for cyber attack response. The method 400 as illustrated includes receiving (e.g., at a compute device) a natural language description of activity on a computer network, at operation 440; executing, based on the natural language description, a natural language processing (NLP) model to provide a tactic and technique of a cyber attack associated with the natural language description, at operation 442; determining, based on the provided tactic and technique, a response to mitigate the cyber attack, at operation 444; and implementing the determined response on the computer network, at operation 446.

The method 400 can further include training the NLP model based on input, output examples that include natural language descriptions of cyber attacks as input and tactics and techniques as output. The tactic can be a high-level description of a behavior that one attempting to carry out a cyber attack is trying to accomplish. The technique can be a detailed description that indicates how a threat actor is trying to accomplish the tactic.

The natural language description can be received through an input software control of a user interface and the tactic and technique are provided on an output software control of the user interface. The determined response can be determined by a response framework coupled to receive traffic activity on the computer network. The NLP model can further provide data indicating a threat actor associated with the tactic and technique.

The foregoing description explains, using simple examples, operation of the NLP model 108. In practice, the incident description 110 is typically paragraphs long and involves multiple tactics and techniques to describe a kill chain. For example, a Mirai attack can involve the following (tactic, technique) pairs: (initial access, exploit public-facing applications), (lateral movement, exploitation of remote services), (discovery, network service scanning), (credential access, brute force), (execution, exploitation for client execution), (command and control, domain generation algorithms), (defense evasion, connection proxy), (impact, network denial of service), (impact, endpoint denial of service). Given an incident description of a Mirai attack, the trained model 108 can provide all of these tactics and techniques as output. The trained model 108 can even provide an indication of an entity that likely performed the Mirai attack.

Artificial intelligence (AI) is a field concerned with developing decision-making systems to perform cognitive tasks that have traditionally required a living actor, such as a person. NNs are computational structures that are loosely modeled on biological neurons. Generally, NNs encode information (e.g., data or decision making) via weighted connections (e.g., synapses) between nodes (e.g., neurons). Modern NNs are foundational to many AI applications, such as text prediction.

Many NNs are represented as matrices of weights (sometimes called parameters) that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The optimal operation of most NNs relies on accurate weights. However, NN designers do not generally know which weights will work for a given application. NN designers typically choose a number of neuron layers or specific connections between layers including circular connections. A training process, which is not required by embodiments thus saving search time, may be used to determine appropriate weights by selecting initial weights. The following description of training provides an explanation of the work that is avoided by embodiments but was required in prior solutions to the same problem of TBALM architecture search.

In some examples, initial weights may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for hack propagation may be used, such as stochastic gradient descent (SGD), Adam, etc.

Figure 5:
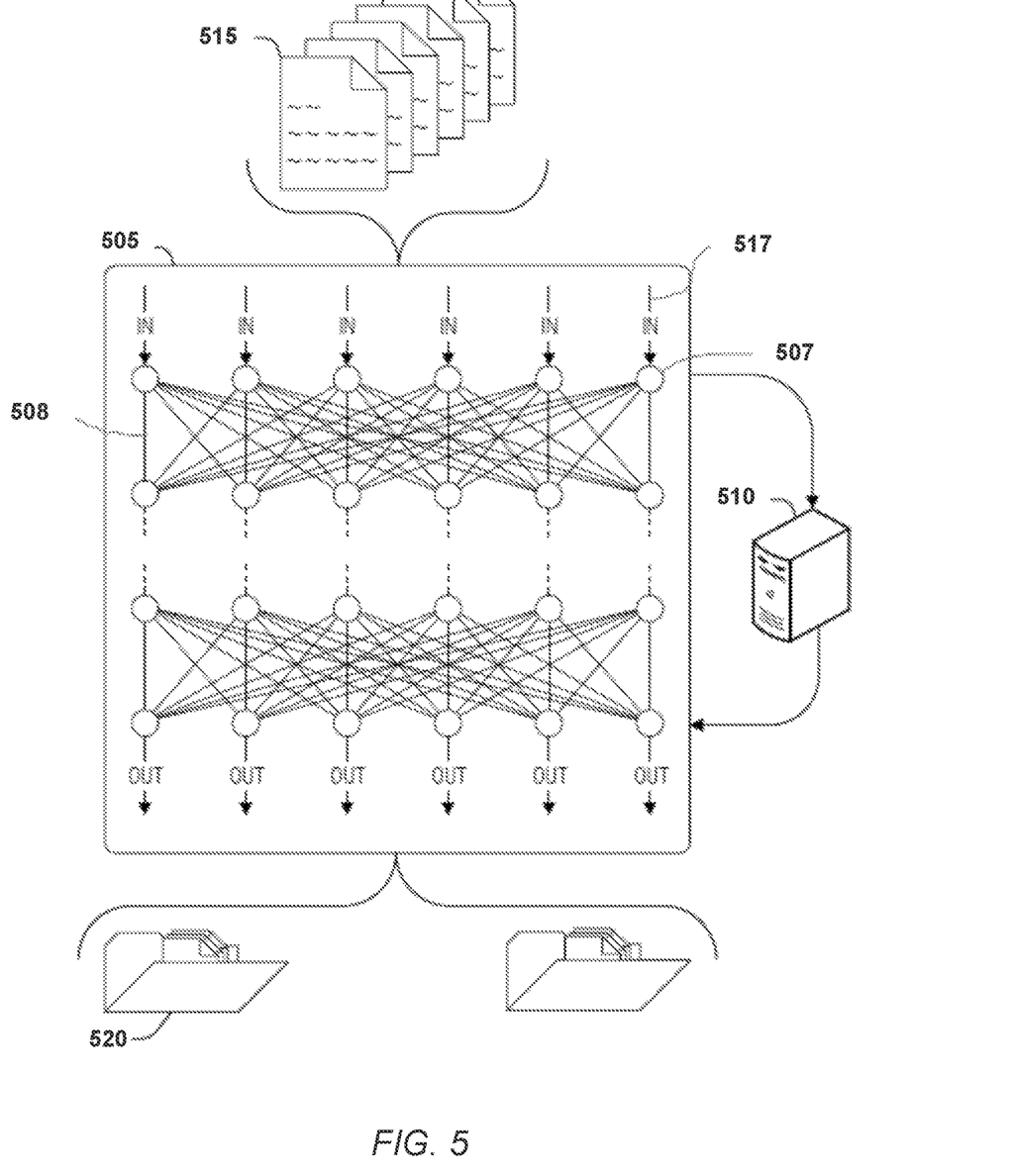
FIG. 5 is a block diagram of an example of an environment including a system for neural network training.

FIG. 5 is a block diagram of an example of an environment including a system for neural network training. The system can predict a tactic and technique of a cyber attack based on a natural language description of the cyber attack. The system includes an artificial NN (ANN) 505 that is trained using a processing node 510. The processing node 510 may be a central processing unit (CPU), graphics processing unit (GPU), field programmable gate array (FPGA), digital signal processor (DSP), application specific integrated circuit (ASIC), or other processing circuitry, in an example, multiple processing nodes may be employed to train different layers of the ANN 505, or even different nodes 507 within layers. Thus, a set of processing nodes 510 is arranged to perform the training of the ANN 505.

The set of processing nodes 510 is arranged to receive a training set 515 for the ANN 505. The ANN 505 comprises a set of nodes 507 arranged in layers (illustrated as rows of nodes 507) and a set of inter-node weights 508 (e.g., parameters) between nodes in the set of nodes. In an example, the training set 515 is a subset of a complete training set. Here, the subset may enable processing nodes with limited storage resources to participate in training the ANN 505.

The training data may include multiple numerical values representative of a domain, such as a word, symbol, number, other part of speech, or the like. Each value of the training or input 517 to be classified after ANN 505 is trained, is provided to a corresponding node 507 in the first layer or input layer of ANN 505. The values propagate through the layers and are changed by the objective function.

As noted, the set of processing nodes is arranged to train the neural network to create a trained neural network. After the ANN is trained, data input into the ANN will produce valid classifications 520 (e.g., the input data 517 will be assigned into categories), for example. The training performed by the set of processing nodes 507 is iterative. In an example, each iteration of the training the ANN 505 is performed independently between layers of the ANN 505. Thus, two distinct layers may be processed in parallel by different members of the set of processing nodes. In an example, different layers of the ANN 505 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 507 neurons) are trained independently. In an example, the nodes are trained on different hardware.

Figure 6:
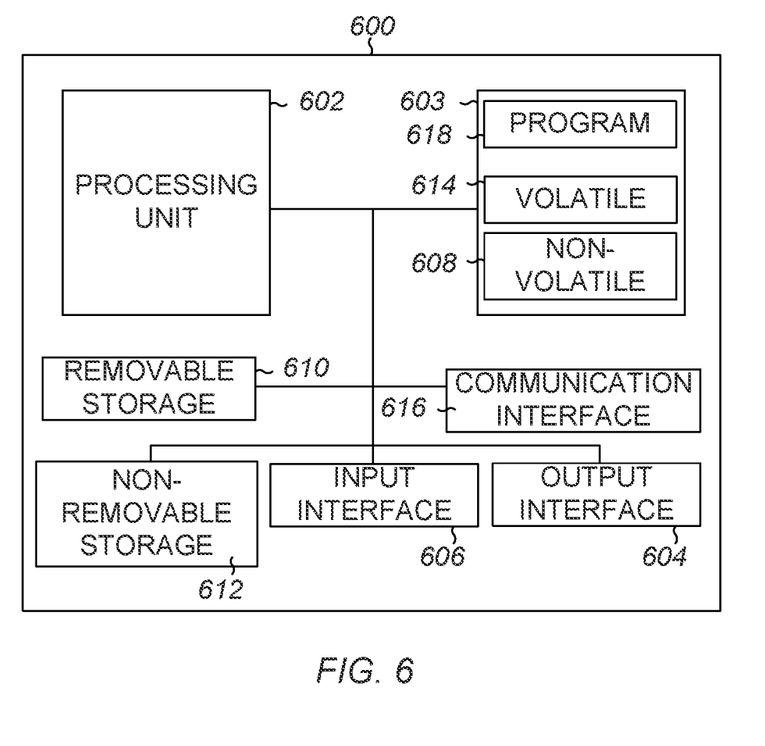
FIG. 6 illustrates, by way of example, a block diagram of an embodiment of a machine (e.g., a computer system) to implement one or more embodiments.

FIG. 6 illustrates, by way of example, a block diagram of an embodiment of a machine 600 (e.g., a computer system) to implement one or more embodiments. The machine 600 can implement a technique for improved contextual data provisioning in a conference. The model trainer 106, response framework 118, compute device 113, network 122, or a component thereof can include one or more of the components of the machine 600. One or more of the method 400, model trainer 106, response framework 118, compute device 113, network 122, trained model 108, or a component or operations thereof can be implemented, at least in part, using a component of the machine 600. One example machine 600 (in the form of a computer), may include a processing unit 602, memory 603, removable storage 610, and non-removable storage 612. Although the example computing device is illustrated and described as machine 600, the computing device may be in different forms in different embodiments. For example, the computing device may instead be a smartphone, a tablet, smartwatch, or other computing device including the same or similar elements as illustrated and described regarding FIG. 6. Devices such as smartphones, tablets, and smartwatches are generally collectively referred to as mobile devices. Further, although the various data storage elements are illustrated as part of the machine 600, the storage may also or alternatively include cloud-based storage accessible via a network, such as the Internet.

Memory 603 may include volatile memory 614 and non-volatile memory 608. The machine 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 600 may include or have access to a computing environment that includes input 606, output 604, and a communication connection 616. Output 604 may include a display device, such as a touchscreen, that also may serve as an input device. The input 606 may include one or more of a touchscreen, touchpad, mouse, keyboard, camera, one or more device-specific buttons, one or more sensors integrated within or coupled via wired or wireless data connections to the machine 600, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 602 (sometimes called processing circuitry) of the machine 600. A hard drive, CD-ROM, and RAM are some examples of articles including a non-transitory computer-readable medium such as a storage device. For example, a computer program 618 may be used to cause processing unit 602 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like). The terms computer-readable medium, machine readable medium, and storage device do not include carrier waves or signals to the extent carrier waves and signals are deemed too transitory.

Additional Notes and Examples

Example 1 can include a method for improved cyber attack response, the method comprising receiving, at a compute device, a natural language description of activity on a computer network, executing, based on the natural language description, a natural language processing (NLP) model to provide a tactic and technique of a cyber attack associated with the natural language description, determining, based on the provided tactic and technique, a response to mitigate the cyber attack, and implementing the determined response on the computer network.

In Example 2, Example 1 can further include training the NLP model based on input, output examples that include natural language descriptions of cyber attacks as input and tactics and techniques as output.

In Example 3, at least one of Examples 1-2 can further include, wherein the tactic is a high-level description of a behavior that one attempting to carry out a cyber attack is trying to accomplish.

In Example 4, Example 3 can further include, wherein the technique is a detailed description that indicates how a threat actor is trying to accomplish the tactic.

In Example 5, at least one of Examples 1-4 can further include, wherein the natural language description is received through an input software control of a user interface and the tactic and technique are provided on an output software control of the user interface.

In Example 6, at least one of Examples 1-5 can further include, wherein the determined response is determined by a response framework coupled to receive traffic activity on the computer network.

In Example 7, at least one of Examples 1-6 can further include, wherein the NLP model further provides data indicating a threat actor associated with the tactic and technique.

Example 8 includes a compute system comprising a memory storing a natural language description of activity on a computer network, processing circuitry coupled to the memory, the processing circuitry configured to execute, based on the natural language description, a natural language processing (NLP) model to provide a tactic and technique of a cyber attack associated with the natural language description, determine, based on the provided tactic and technique, a response to mitigate the cyber attack, and implement the determined response on the computer network.

In Example 9, Example 8 can further include, wherein the processing circuitry is further configured to train the NLP model based on input, output examples that include natural language descriptions of cyber attacks as input and tactics and techniques as output.

In Example 10, at least one of Examples 8-9 can further include, wherein the tactic is a high-level description of a behavior that one attempting to carry out a cyber attack is trying to accomplish.

In Example 11, Example 10 can further include, wherein the technique is a detailed description that indicates how a threat actor is trying to accomplish the tactic.

In Example 12, at least one of Examples 8-11 can further include a user interface coupled to the processing circuitry, the user interface configured to receive through an input software control of the user interface and the provide the tactic and technique on an output software control of the user interface.

In Example 13, at least one of Examples 8-12 can further include a response framework configured to receive the tactic and technique and determine the response based on the tactic and technique and traffic activity on the computer network.

In Example 14, at least one of Examples 8-13 can further include, wherein the NLP model further provides data indicating a threat actor associated with the tactic and technique.

Example 15 includes a machine-readable medium including instructions that, when executed by a machine, cause the machine to perform operations comprising receiving a natural language description of activity on a computer network, executing, based on the natural language description, a natural language processing (NLP) model to provide a tactic and technique of a cyber attack associated with the natural language description, determining, based on the provided tactic and technique, a response to mitigate the cyber attack, and implementing the determined response on the computer network.

In Example 16, Example 15 can further include, wherein the operations further comprise training the NLP model based on input, output examples that include natural language descriptions of cyber attacks as input and tactics and techniques as output.

In Example 17, at least one of Examples 15-16 can further include, wherein the tactic is a high-level description of a behavior that one attempting to carry out a cyber attack is trying to accomplish.

In Example 18, Example 17 can further include, wherein the technique is a detailed description that indicates how a threat actor is trying to accomplish the tactic.

In Example 19, at least one of Examples 15-18 can further include, wherein the natural language description is received through an input software control of a user interface and the tactic and technique are provided on an output software control of the user interface.

In Example 20, at least one of Examples 15-19 can further include, wherein the determined response is determined by a response framework coupled to receive traffic activity on the computer network.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may, be within the scope of the following claims.

What is claimed is:
1. A method comprising:
receiving, at a compute device, a natural language description of activity on a computer network;
executing, based on the natural language description, a natural language processing (NLP) model that provides (i) a tactic and technique of a cyber attack associated with the natural language description and (ii) an entity associated with performing the cyber attack, the tactic and technique are one of a plurality of predetermined tactic and technique pairs, each tactic associated with multiple techniques, the tactic indicating a high-level description of a behavior that one attempting to carry out a cyber attack is trying to accomplish in the computer network and the technique indicating a detailed description that indicates how a threat actor is trying to accomplish the tactic of the cyber attack;
determining, by a response framework coupled to receive the tactic and technique and the entity and log data from the computer network that details traffic on the computer network, the traffic including at least three of (i) logon attempts, (ii) tasks executed, (iii) files stored, (iv) files or communications sent, (v) data or operation request send, (vi) responses to data or operation request, or (vii) files opened and based on the provided tactic, technique, and the entity a response to mitigate the cyber attack; and
implementing the determined response on the computer network.

2. The method of claim 1, further comprising training the NLP model based on input and output example pairs that include respective natural language descriptions of cyber attacks and a first entity that performed a corresponding cyber attack of the cyber attacks as input and respective tactic and technique pairs and a possible entity as output.

3. The method of claim 1, wherein the natural language description is received through an input software control of a user interface and the tactic and technique and the entity are provided on an output software control of the user interface.

4. A compute system comprising:
a memory storing a natural language description of activity on computer network;
processing circuitry coupled to the memory, the processing circuitry configured to:
execute, based on the natural language description, a natural language processing (NLP) model that provides (i) a tactic and technique of a cyber attack associated with the natural language description and (ii) an entity associated with performing the cyber attack, the tactic and technique are one of a plurality of predetermined tactic and technique pairs, each tactic associated with multiple techniques, the tactic indicating a high-level description of a behavior that one attempting to carry out a cyber attack is trying to accomplish in the computer network and the technique indicating a detailed description that a how a threat actor is trying to accomplish the tactic of the cyber attack; the NLP model trained (i) based on input and output example pairs that include (a) respective natural language descriptions of cyber attacks and (b) a first entity that performed a corresponding cyber attack of the cyber attacks as input and (ii) to provide respective tactic and technique pairs and a possible entity as output;

determine, based on the provided tactic and technique, a response to mitigate the cyber attack; and implement the determined response on the computer network.

5. The system of claim 4, further comprising a user interface coupled to the processing circuitry, the user interface configured to receive the natural language description through an input software control of the user interface and the provide the tactic and technique and the entity on an output software control of the user interface.

6. The system of claim 4, further comprising a response framework configured to:

receive the tactic and technique and the entity and log data from the computer network that details traffic on the computer network, the traffic including logon attempts, tasks executed, files opened, files stored, files or communications sent, data or operation requests sent, and responses to data or operation requests; and determine the response based on the tactic and technique and traffic on the computer network.

7. A machine-readable medium including instructions that, when executed by a machine, cause the machine to perform operations comprising:

receiving a natural language description of activity on a computer network;

executing, based on the natural language description, a natural language processing (NLP) model that provides (i) a tactic and technique of a cyber attack associated with the natural language description and (ii) an entity associated with performing the cyber attack, the tactic and technique are one of a plurality of predetermined tactic and technique pairs, each tactic associated with multiple techniques, the tactic indicating a high-level description of a behavior that one attempting to carry out a cyber attack is trying to accomplish in the computer network and the technique indicating a detailed description that indicates how a threat actor is trying to accomplish the tactic of the cyber attack, the NLP model trained (i) based on input and output example pairs that include (a) respective natural language descriptions of cyber attacks and (b) a first entity that performed a corresponding cyber attack of the cyber attacks as input and (ii) to provide respective tactic and technique pairs and a possible entity as output;

determining, based on the provided tactic, technique, and the entity a response to mitigate the cyber attack; and implement the determined response on the computer network.

8. The machine-readable medium of claim 7, wherein the natural language description is received through an input software control of a user interface and the tactic and technique and the entity are provided on an output software control of the user interface.

9. The machine-readable medium of claim 7, wherein the determined response is determined by a response framework coupled to receive the tactic and technique and the entity and log data from the computer network that details traffic on the computer network, the traffic including logon attempts, tasks executed, files opened, files stored, files or communications sent, data or operation requests sent, and responses to data or operation requests.

* * * * *